(12) United States Patent
Yorita

(10) Patent No.: US 8,189,262 B2
(45) Date of Patent: May 29, 2012

(54) OPTICAL SHEET, AND MOUNTING METHOD AND OPTICAL MODULE USING THE OPTICAL SHEET

(75) Inventor: Jun Yorita, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 12/523,257

(22) PCT Filed: Jan. 24, 2008

(86) PCT No.: PCT/JP2008/050950
§ 371 (c)(1),
(2), (4) Date: Mar. 18, 2010

(87) PCT Pub. No.: WO2008/090945
PCT Pub. Date: Jul. 31, 2008

(65) Prior Publication Data
US 2010/0165471 A1    Jul. 1, 2010

(30) Foreign Application Priority Data

Jan. 25, 2007 (JP) ................................ 2007-015290

(51) Int. Cl.
*G02B 27/10* (2006.01)
(52) U.S. Cl. ........................................................ 359/627
(58) Field of Classification Search ........... 357/627–636
See application file for complete search history.

(56) References Cited

U.S. PATENT DOCUMENTS

| 6,099,135 A * | 8/2000 | Oda et al. | 362/620 |
| 6,254,245 B1 * | 7/2001 | Uehara | 362/609 |
| 7,477,450 B2 * | 1/2009 | Abe | 359/455 |
| 2002/0167485 A1 * | 11/2002 | Hedrick | 345/156 |
| 2006/0028722 A1 * | 2/2006 | Miyata | 359/460 |
| 2006/0076524 A1 * | 4/2006 | Yoshigoe et al. | 250/573 |

FOREIGN PATENT DOCUMENTS

| JP | 62-145233 | * 12/1985 |
| JP | 05-053033 | 3/1993 |
| JP | 05-273444 | 10/1993 |
| JP | 2001-174671 | 6/2001 |
| JP | 2002-189137 | 7/2002 |

(Continued)

OTHER PUBLICATIONS

"Application of Existing Electronic Component Mounting Device," Nikkei Electronics, Dec. 3, 2001, p. 124, with Partial English Translation.

(Continued)

*Primary Examiner* — Ricky Mack
*Assistant Examiner* — Brandi Thomas
(74) *Attorney, Agent, or Firm* — McDermott Will & Emery LLP

(57) ABSTRACT

A three-dimensional optical sheet is arranged between optical elements and a substrate for optically connecting the optical elements and the substrate and includes a sheet section, convex lens sections, and reflecting sections. The sheet section has first and second main surfaces. The convex lens sections are provided on the first main surface for collecting light. The reflecting sections are provided on the second main surface and change the direction of light traveling along the second main surface such that the light enters the convex lens sections.

11 Claims, 14 Drawing Sheets

FOREIGN PATENT DOCUMENTS

| | | |
|---|---|---|
| JP | 2006-137092 | 6/2006 |
| JP | 2006-139148 | 6/2006 |
| JP | 2006-334987 | 12/2006 |
| JP | 2007-011255 | 1/2007 |

OTHER PUBLICATIONS

T. Ishitsuka et al., "Optical Modules using organic substrates," MES2003, The 13th Micro-Electronics Symposium, Oct. 2003. pp. 388-391, with English Translation.

Masao Kinoshita et al., "Fabrication of Thinning Optical Devices by Using Epitaxial Lift-off Technology," MES2003, The 13th Micro-Electronics Symposium, Oct. 2003, pp. 380-383, with English Translation.

\* cited by examiner

OPTICAL SHEET, AND MOUNTING METHOD AND OPTICAL MODULE USING THE OPTICAL SHEET

RELATED APPLICATIONS

This application is the U.S. National Phase under 35 U.S.C. §371 of International Application No. PCT/JP2008/050950, filed on Jan. 24, 2008, which in turn claims the benefit of Japanese Application No. 2007-015290, filed on Jan. 25, 2007, the disclosures of which Applications are incorporated by reference herein.

TECHNICAL FIELD

The present invention relates to an optical sheet for optically connecting optical elements and a substrate. Furthermore, the present invention relates to a mounting method by optically connecting optical elements to a substrate via the optical sheet and relates to an optical module including the optical sheet.

BACKGROUND ART

In recent years, conversion of an electrical signal into an optical signal has been attempted, corresponding to a requirement for high-speed signal transmission in a module, and interface BGAs that interconvert electricity and light have been developed. The interface BGAs can perform optical connection as well as electric connection. FIG. 32 illustrates a fundamental structure of an interface BGA. As shown in FIG. 32, the interface BGA includes a semiconductor device 81, a packaging substrate 82, and solder balls 83. In order to transmit and receive high-speed signals, the packaging substrate 82 includes surface emitting lasers 84 for transmitting signals and photodiodes (not shown) for receiving signals on the bottom face side. The surface emitting lasers 84 and the photodiodes are sealed with a resin layer 86. Furthermore, microlenses 85 are arranged on the resin layer 86.

FIG. 33 shows a mode of mounting the interface BGA on a printed circuit board. The semiconductor device 81 and the packaging substrate 82 are mounted on a printed circuit board 97 via the solder balls 83. Since the solder balls 83 are used for the mounting, the distance W between the packaging substrate 82 and the printed circuit board 97 is equal to the diameter of the solder balls 83 and is usually 400 μm. Light emitted from the surface emitting laser 84 is collimated by the microlens 85 so that crosstalk between the adjacent optical signals is not caused when the light is scattered in this distance W. The optical signals, when reached a microlens 95 on the printed circuit board 97 side, are collected by a microlens 95 and then guided to an optical waveguide 98 (Non-Patent Document 1).

In order to guide the optical signals collected by the microlens 95 to the optical waveguide 98, for example, a mirror 99 inclining by 45° is disposed in the optical waveguide 98 to change the optical path by 90°. In another method, an end face of the core of an optical fiber as the optical waveguide 98 is diced by an inclination of 45°, and the cut surface is deposited with, for example, Ag or Al (Non-Patent Documents 2 and 3). These are the same in the case that optical signals transmitted along a plane of the printed circuit board 97 in the optical waveguide 98 are sent up by 90° to be transmitted to the semiconductor device 81.

The microlens can be produced by, for example, a resist reflow method. In this method, a resin layer formed on a substrate is patterned into a cylindrical shape by a photolithographic method and then reflowed by heating, so that a microlens is formed by surface tension of the resin.

[Non-Patent Document 1] NIKKEI ELECTRONICS, Dec. 3, 2001, p. 124.
[Non-Patent Document 2] M. Kinoshita, et al., "Thin film formation for photonic device by epitaxial lift-off (ELO) technique, MES2003, The 13th Micro-Electronics Symposium, October, 2003, pp. 380-383.
[Non-Patent Document 3] T. Ishitsuka, et al. "Experimental production of optical module with printed board, MES2003, The 13th Micro-Electronics Symposium, October, 2003, pp. 388-391.

DISCLOSURE OF INVENTION

Problems to be Solved by the Invention

In the known interface BGA, the mirrors inclining by 45° and the microlenses are formed separately by different processes. Therefore, in mounting, alignment of the optical elements, the mirrors, the optical waveguide, and the microlenses is difficult. An alignment precision of an order of μm is required in the Z-direction as well as in the X- and Y-directions, and such alignment is necessary in all the optical elements and the microlenses. Furthermore, the shapes of the microlenses are affected by, for example, the surface tension, the viscosity, and the temperature of a resin and therefore are not uniform. Consequently, it takes considerable time and effort to align the microlenses such that the focal points of all the plurality of microlenses formed on the bottom face of the interface BGA are completely focused in the Z-direction.

In addition, since the shapes of the microlenses are not uniform as described above, the fabrication yield of the microlenses is low. Furthermore, it is impossible to repair the microlens directly fabricated on the interface BGA. Therefore, even if a part of the plurality of microlenses formed on the bottom face of the interface BGA has a defect, the whole interface BGA including the semiconductor device has to be discarded, resulting in an increase in loss. Furthermore, a complicated process is necessary for fabricating the microlenses. In addition, it is complicated and expensive to form a mirror with high accuracy by another process or to form an inclination of 45° in the optical waveguide by a dicing process.

A first object of the present invention is to provide an optical sheet having high accuracy and being readily mounted. A second object thereof is to provide a mounting method that makes alignment easy. Furthermore, it is an object of the present invention to provide an optical module having high accuracy and of low cost.

Means for Solving the Problems

The optical sheet of the present invention is disposed between optical elements and a substrate and thereby optically connects the optical elements and the substrate. The optical sheet includes a sheet section, convex lens sections, and reflecting sections. The sheet section includes first and second main surfaces. The convex lens sections are provided on the first main surface and collect light. The reflecting sections are provided on the second main surface and change the direction of light traveling along the second main surface such that the light enters the convex lens sections.

In the optical sheet, the reflecting sections are preferably configured so as to change the direction of light traveling along the second main surface by 90°.

In the optical sheet, the convex lens sections are preferably either hemispherical or D-shaped.

In the optical sheet, the convex lens sections are preferably arrayed either in an area array or in a linear array.

In the optical sheet, the reflecting sections each preferably include a portion covered with at least one material selected from the group consisting of gold, silver, and aluminum.

In the optical sheet, the optical sheet preferably includes a portion formed of a material that is irradiated with an electron beam.

In the optical sheet, the convex lens sections and the reflecting sections are preferably formed by a mold process using a mold tool.

In the optical sheet, the mold tool is preferably produced by a process including the steps of forming a resin mold by a lithography process, forming a layer composed of a metal material on the resin mold by plating, and removing the resin mold.

In the optical sheet, the mold tool is preferably produced by a process including the steps of forming a resin mold by a mold process, forming a layer composed of a metal material on the resin mold by plating, and removing the resin mold.

The mounting method of the present invention includes the steps of preparing the above-described optical sheet and mounting optical elements on a substrate such that the optical elements and the substrate are optically connected via the optical sheet.

The optical module of the present invention includes the above-described optical sheet, a substrate, and optical elements. The substrate supports the optical sheet. The optical elements are optically connected to the substrate via the optical sheet.

Advantages

It is provided an optical sheet that has high accuracy and can be easily mounted.

Figure 1:
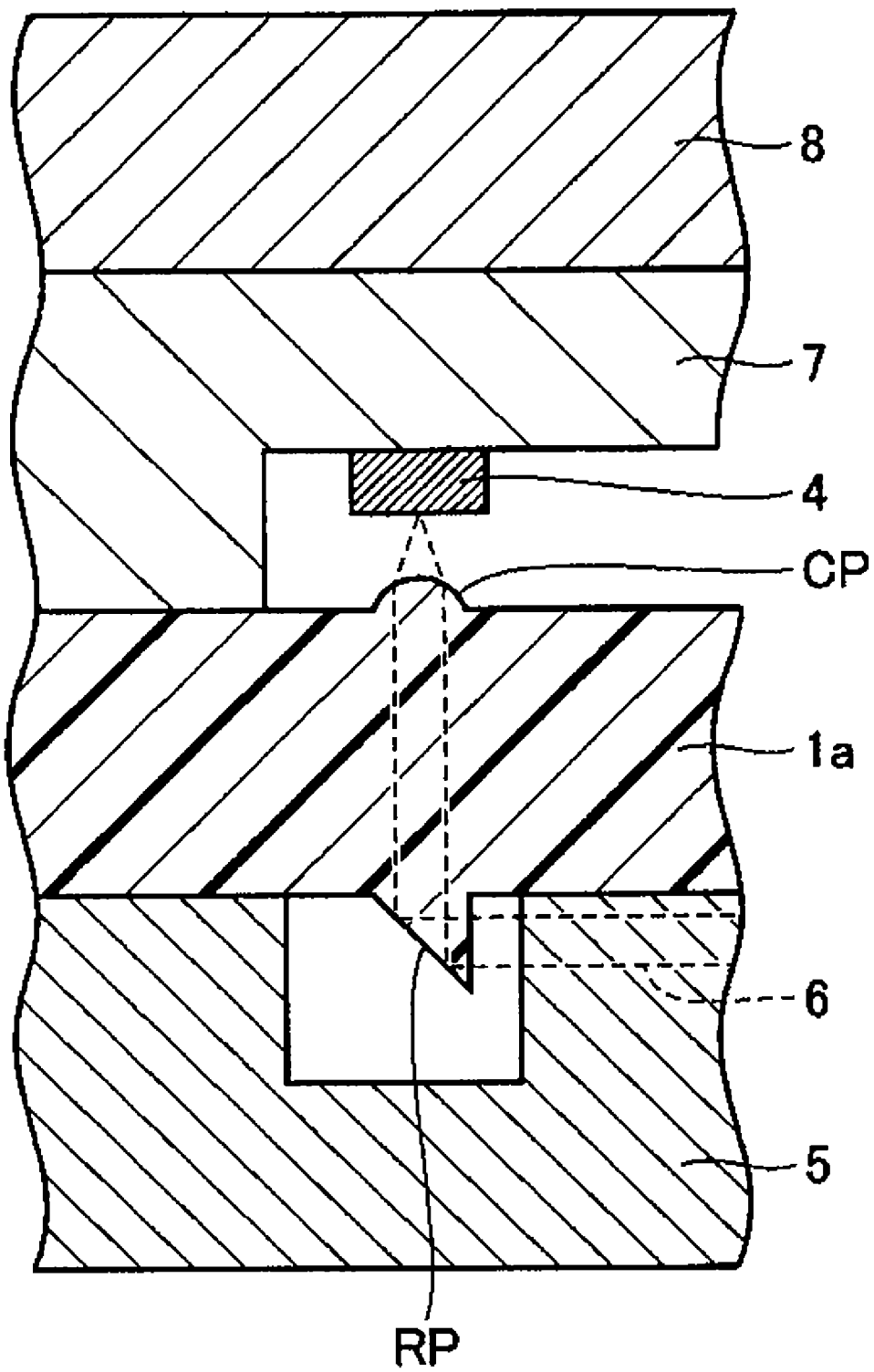
FIG. 1 is a schematic partial cross-sectional view illustrating a manner that a three-dimensional optical sheet according to an embodiment of the present invention is disposed between optical elements and a substrate.

REFERENCE NUMERALS 1a to 1d: three-dimensional optical sheet, 2A, 2L: convex lens section, 3DL, 3SA, 3SL: reflecting section, 4: optical element, 5: substrate, 6: optical signal, 10: thin resin film, 52a, 53a: mold tool, 77: thin metallic film

BEST MODES FOR CARRYING OUT THE INVENTION

Three-Dimensional Optical Sheet

Figure 2:
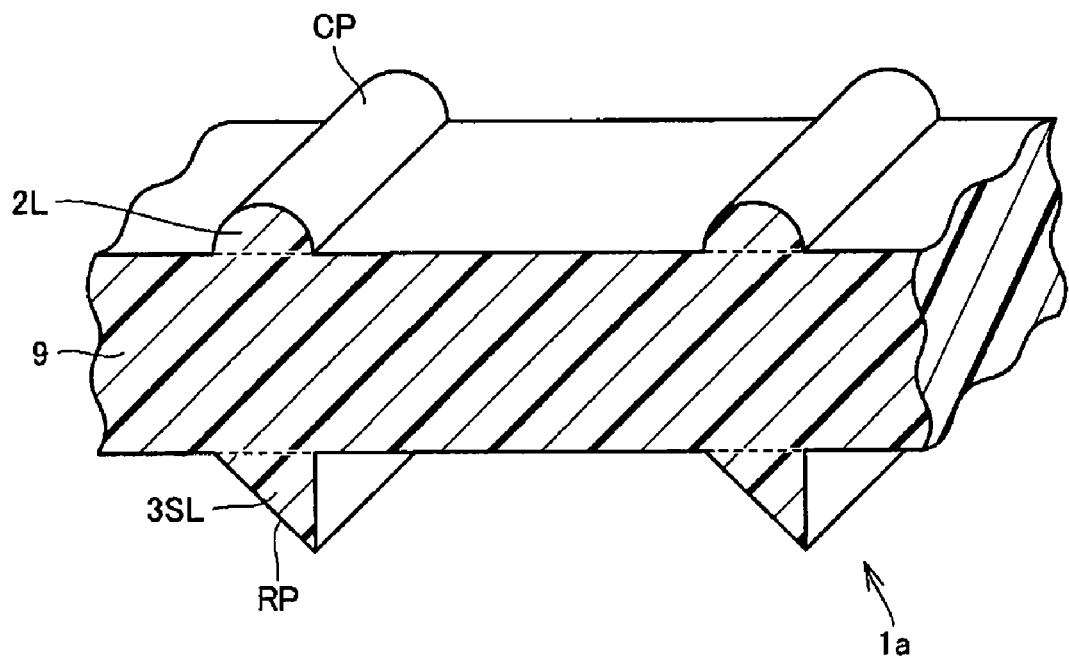
FIG. 2 is a partial cross-sectional perspective view schematically illustrating a configuration of the three-dimensional optical sheet according to the embodiment of the present invention.

FIG. 1 is a schematic partial cross-sectional view illustrating a manner that a three-dimensional optical sheet according to an embodiment of the present invention is disposed between optical elements and a substrate. FIG. 2 is a partial cross-sectional perspective view schematically illustrating a configuration of the three-dimensional optical sheet according to the embodiment of the present invention.

In reference to FIGS. 1 and 2, the optical module according to this embodiment includes a three-dimensional optical sheet 1a, a substrate 5, optical elements 4, a package substrate 7, and a semiconductor device 8. The three-dimensional optical sheet 1a is supported by the substrate 5. The optical elements 4 are optically connected to the substrate 5 via the three-dimensional optical sheet 1a.

The three-dimensional optical sheet 1a is disposed between the optical elements 4 and the substrate 5 for optically connecting the optical elements 4 and the substrate 5 and includes a sheet section 9, convex lens sections 2L, and reflecting sections 3SL. The sheet section 9 is a sheet-like member including a first main surface (top surface in the drawing) and a second main surface (bottom surface in the drawing). The convex lens sections 2L are provided on the first main surface and collect light. The reflecting sections 3SL are provided on the second main surface and change the directions of optical signals 6 traveling along the second main surface such that the optical signals 6 enter the convex lens sections 2L. The three-dimensional optical sheet 1a can be provided with heat resistance increased by cross-link due to, for example, electron beam irradiation, and, thereby, the durability to flow solder temperature in mounting can be increased.

The convex lens sections 2L each have a convex lens surface CP that is a D-shaped curved surface for collecting light, and a plurality of convex lens sections 2L are formed such that the D-shapes are arrayed in a column. That is, the convex lens sections 2L are arrayed in a linear array. The reflecting sections 3SL also extend along the direction in which the D-shapes extend.

The reflecting sections 3SL each have a reflecting surface RP for reflecting light to change the direction of the light. The reflecting surface RP is provided such that the optical axis of the reflecting section 3SL coincides with the optical axis of the convex lens section 2L. The optical signal 6 transmitted along a plane of the substrate 5, namely, the second main surface of the sheet section 9, is reflected by the reflecting surface RP, and thereby the direction of the optical signal 6 is changed by 90° so as to travel in the direction toward the top of the drawing. Consequently, the optical signal 6 can be transmitted to the optical element 4. In addition, the optical signal emitted from the optical element 4 can be transmitted along a plane of the substrate 5, namely, the second main surface of the sheet section 9, by being reflected at an angle of 90°.

Figure 3:
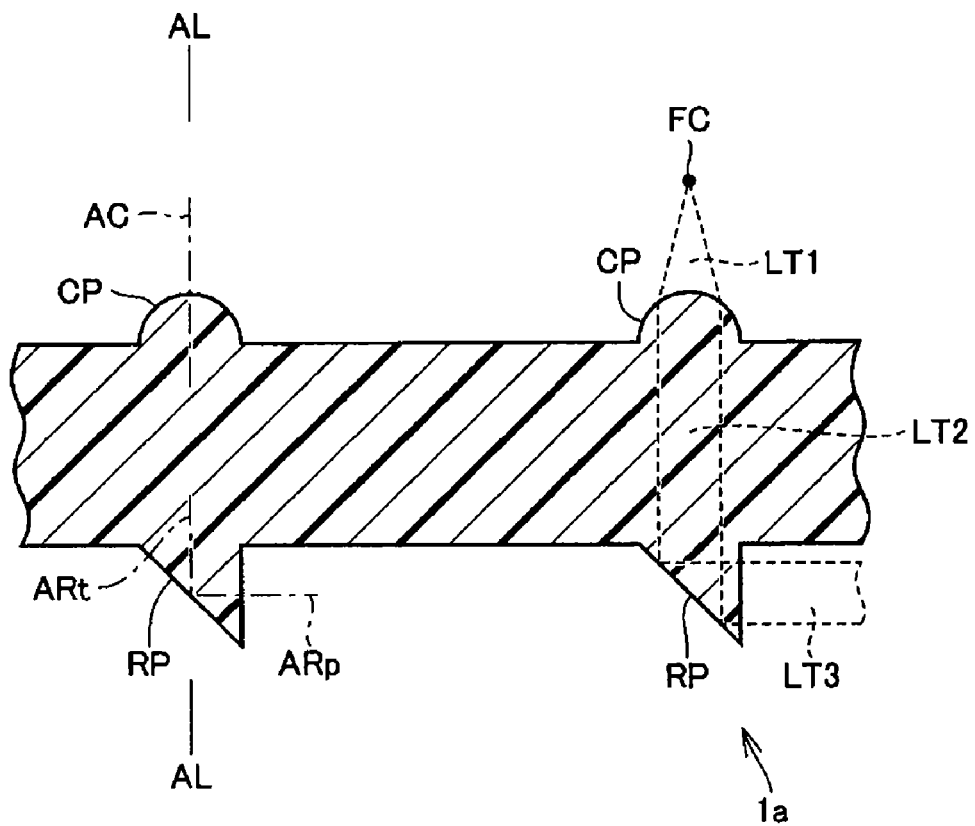
FIG. 3 is a schematic partial cross-sectional view illustrating a configuration of a three-dimensional optical sheet according to an embodiment of the present invention and a principle of function of the three-dimensional optical sheet.

FIG. 3 is a schematic partial cross-sectional view illustrating a configuration of a three-dimensional optical sheet according to an embodiment of the present invention and a principle of function of the three-dimensional optical sheet. In reference to FIG. 3, in the optical axes ARt and ARp of the reflecting surface RP, the optical axis ARt on the convex lens surface CP side coincides with the optical axis AC of the convex lens surface CP on a straight line AL. In this description, "coincidence of optical axes" means that the optical axes coincide with each other within an error range of 2 μm or less. The optical axis AC of the convex lens surface CP is the center line of an optical path when light LT1 from a point light source placed at a focal point FC of the convex lens surface CP is collimated into parallel light LT2 by the convex lens surface CP. The optical axis ARt of the reflecting surface RP is the center line of an optical path for part to be reflected as light LT3 of the light LT2.

The optical connection between the optical elements 4 and the substrate 5 is achieved by the convex lens sections 2L and their corresponding reflecting sections 3SL. Since the convex lens sections 2L and the reflecting sections 3SL are formed on the same sheet section 9, the alignment accuracy and yield are higher than those of the known interface BGA in which microlenses and inclined mirrors are formed separately by different processes. In addition, the mounting is easy, resulting in a reduction in the cost. Therefore, the mounting method of mounting the optical elements 4 on the substrate 5 such that the optical elements 4 are optically connected to the substrate 5 via the three-dimensional optical sheet 1a of this embodiment can be performed with high accuracy and high yield at low cost. Furthermore, the optical module (FIG. 1) in which the optical elements 4 are optically connected to the substrate 5 via the three-dimensional optical sheet 1a of this embodiment also can be produced with high accuracy and high yield at low cost.

Figure 4:
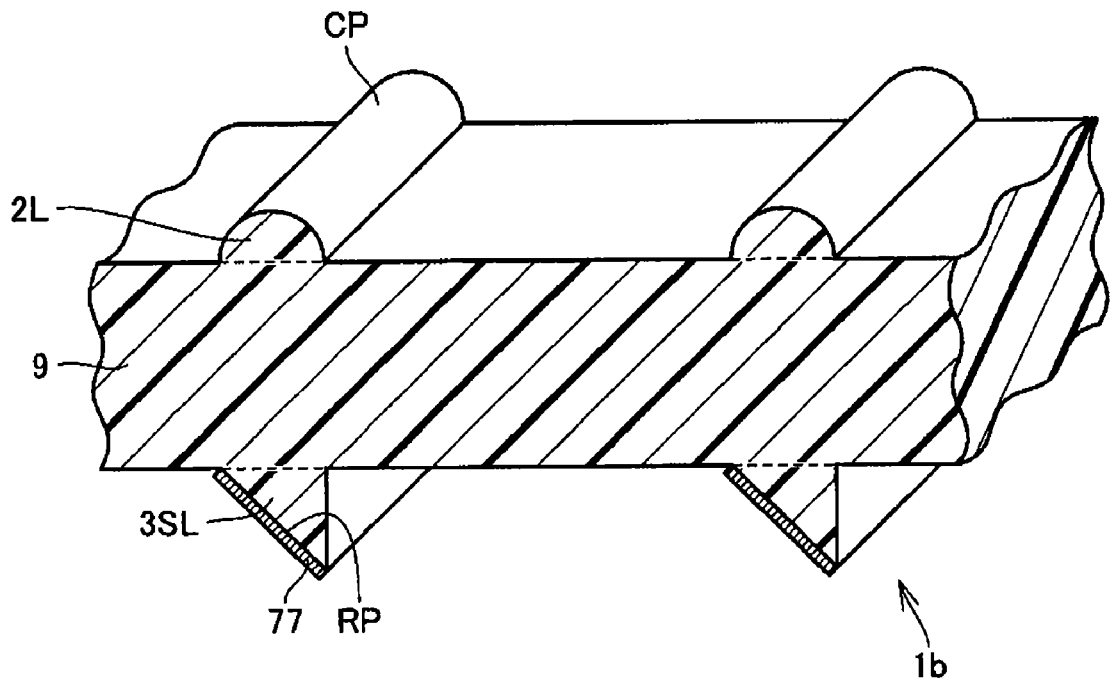
FIG. 4 is a partial cross-sectional perspective view schematically illustrating a configuration of a three-dimensional optical sheet in a first modification according to an embodiment of the present invention.

FIG. 4 is a partial cross-sectional perspective view schematically illustrating a configuration of a three-dimensional optical sheet in a first modification according to an embodiment of the present invention. In reference to FIG. 4, the reflecting sections 3SL of the three-dimensional optical sheet 1b of this modification each include a thin metallic film 77 on the surface of the reflecting surface RP. The efficiency of reflecting an optical signal can be increased by thus covering at least part of the surface of the reflecting section 3SL with the thin metallic film 77. The material for the thin metallic film 77 is preferably gold, silver, or aluminum from the viewpoint of increasing the amount of light to the optical element 4 by increasing the reflection efficiency. The thin metallic film 77 can be formed by, for example, a sputtering method.

Figure 5:
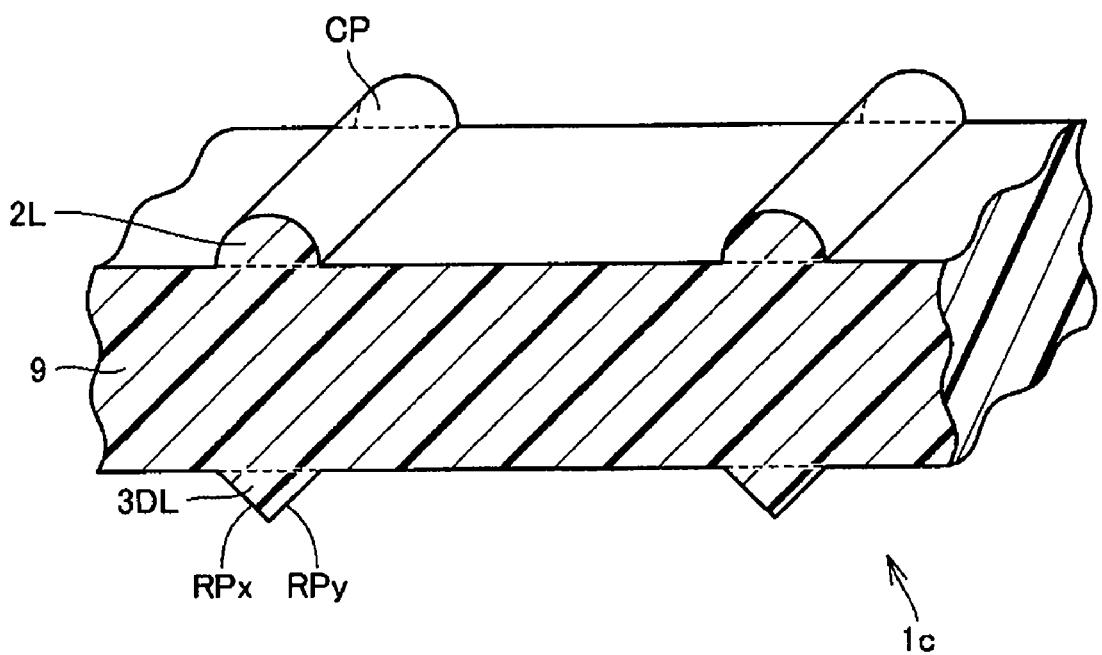
FIG. 5 is a partial cross-sectional perspective view schematically illustrating a configuration of a three-dimensional optical sheet in a second modification according to an embodiment of the present invention.
Figure 6:
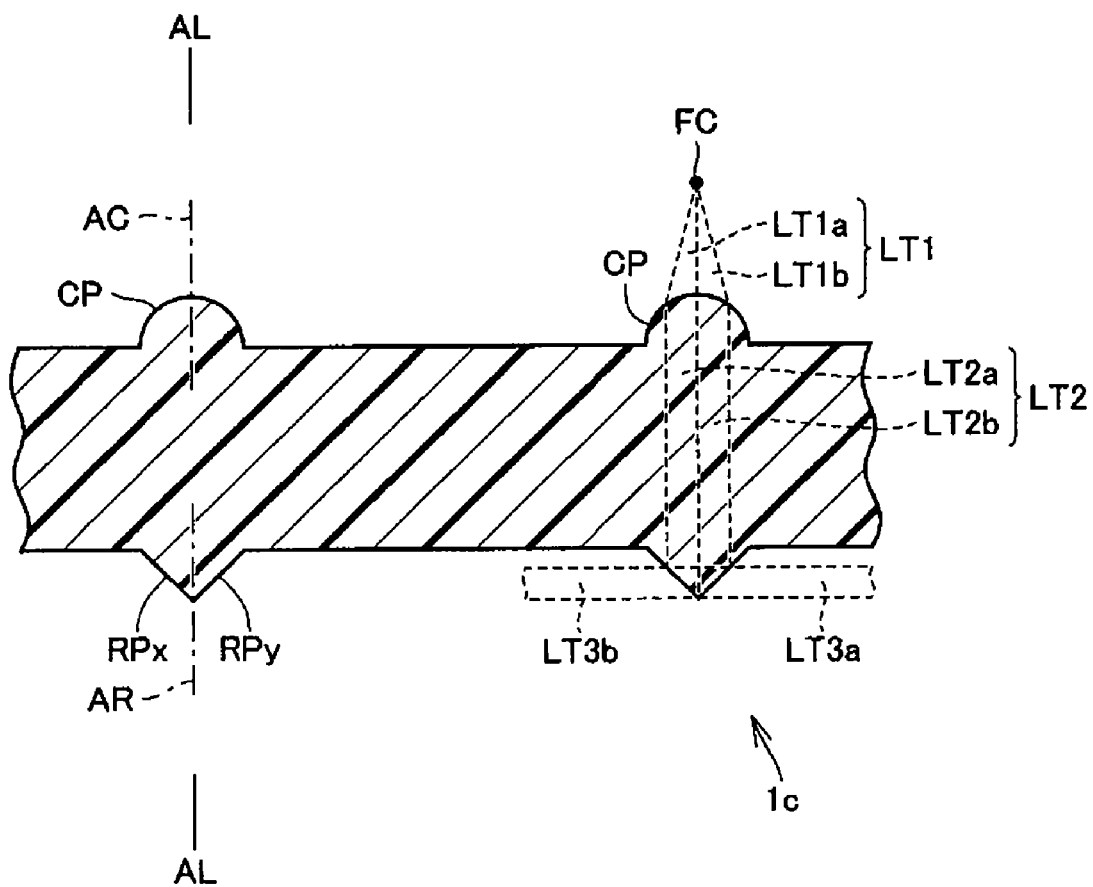
FIG. 6 is a schematic partial cross-sectional view illustrating the configuration of the three-dimensional optical sheet in the second modification according to the embodiment of the present invention and a principle of function of the three-dimensional optical sheet.

FIG. 5 is a partial cross-sectional perspective view schematically illustrating a configuration of a three-dimensional optical sheet in a second modification according to an embodiment of the present invention. FIG. 6 is a schematic partial cross-sectional view illustrating the configuration of the three-dimensional optical sheet in the second modification according to the embodiment of the present invention and a principle of function of the three-dimensional optical sheet. In reference to FIGS. 5 and 6, the three-dimensional optical sheet 1c of this modification includes reflecting sections 3DL. The reflecting sections 3DL each have reflecting surfaces RPx and RPy with an optical axis AR as the axis of symmetry. The optical axis AR and the optical axis AC coincide with each other on a straight line AL.

Light LT1a in light LT1 is collimated into parallel light LT2a by the convex lens surface CP, and the parallel light LT2a can be reflected as light LT3a by the reflecting surface RPx. The light LT3a is refracted when passing through the reflecting surface RPy. Similarly, light LT1b in the light LT1 is collimated into parallel light LT2b by the convex lens surface CP, and the parallel light LT2b can be reflected as light LT3b by the reflecting surface RPy. The light LT3b is refracted when passing through the reflecting surface RPx.

That is, the reflecting section 3DL is configured so as to change the direction of light by reflection and refraction. By this configuration, the three-dimensional optical sheet 1c can convert the light from a focal point FC to the light LT3a and the LT3b traveling along the bottom face of the sheet section 9. Conversely, the three-dimensional optical sheet 1c can convert the light LT3a and the LT3b traveling along the bottom face of the sheet section 9 to the light LT1 that converges on the focal point FC.

Figure 7:
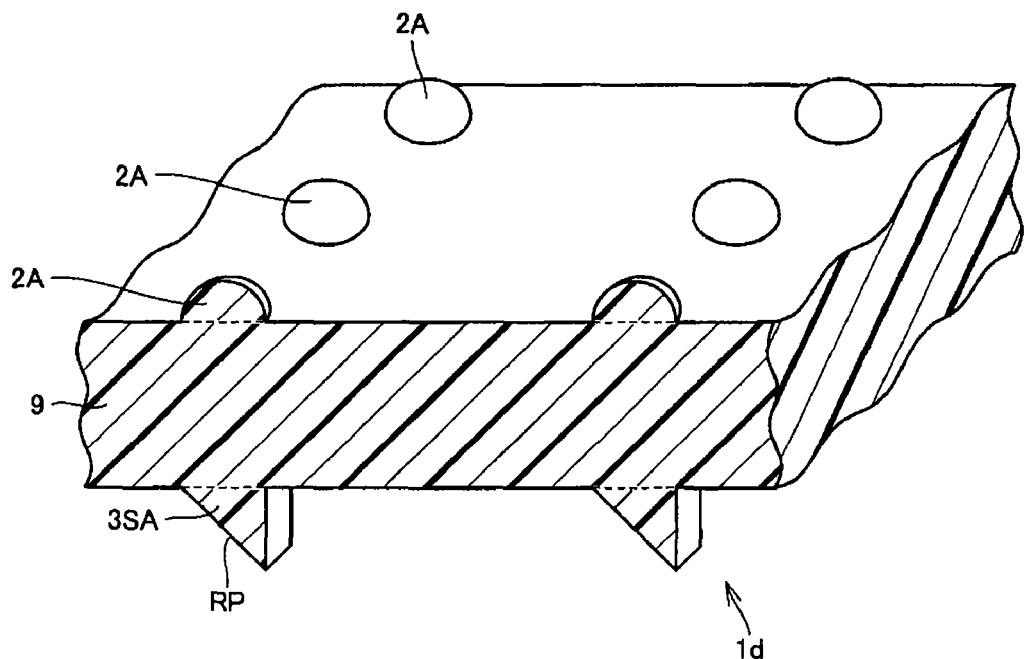
FIG. 7 is a partial cross-sectional perspective view schematically illustrating a configuration of a three-dimensional optical sheet in a third modification according to an embodiment of the present invention.

FIG. 7 is a partial cross-sectional perspective view schematically illustrating a configuration of a three-dimensional optical sheet in a third modification according to an embodiment of the present invention. In reference to FIG. 7, the three-dimensional optical sheet 1d of this modification includes convex lens sections 2A and reflecting sections 3SA. The convex lens sections 2A are hemispherical for collecting light, and a plurality of convex lens sections 2A are formed such that the hemispherical shapes are two-dimensionally arrayed. That is, the convex lens sections 2A are arrayed in an area array. The reflecting sections 3SA are positioned on the second main surface (bottom face of the drawing) of the sheet section 9 so as to correspond to the respective positions of the convex lens sections 2A on the first main surface (top surface in the drawing) of the sheet section 9.

Which shape, D-shape (FIG. 2) or hemisphere (FIG. 7), is applied to the convex lens sections can be determined according to, for example, the density of the optical elements 4, the required accuracy, and the easiness of producing a mold tool that is used in the production. In addition, either the linear array (FIG. 2) or the area array (FIG. 7) is selected according to the alignment and density of the optical elements 4 to be connected and the necessary accuracy.

Process of Producing Three-Dimensional Optical Sheet

The three-dimensional optical sheet of the present invention can be produced by a mold process using a mold tool. In a resist reflow method, the surface tension, the viscosity, and the temperature of a resin affect the shapes of microlenses, resulting in ununiformity of the size. However, since the three-dimensional optical sheets 1a to 1d according to this embodiment are each formed by the mold process using a mold tool, the shapes of the lenses can be reproduced with high accuracy.

In the three-dimensional optical sheet, the rising angle of light depends on the angle of the reflecting surface RP, RPx, or RPy, and the convergence property of the convex lens surface CP depends on the radius of curvature, the roundness, and the optical path length of the lens. In addition, the efficiency of waveguiding light depends on the rising efficiency, the optical axis accuracy, and the surface roughness of the reflecting surface RP, RPx, or RPy. In the production process of this embodiment, since the shapes of the convex lens sections 2L and 2A and the reflecting sections 3SL, 3DL, and 3SA can be reproduced with high accuracy, it is easy to finely adjust the rising angle of light, the convergence property of a convex lens, and the efficiency of waveguiding light. In addition, even in the formation of the plurality of convex lens sections 2L or 2A, adjustment of the focal points and the indices of refraction of the convex lens sections 2L or 2A and alignment thereof are easy. Furthermore, since the accuracy of shapes of the convex lens sections 2L and 2A and the reflecting sections 3SL, 3DL, and 3SA are high, the three-dimensional optical sheets 1a to 1d can be produced with high yields. In addition, the three-dimensional optical sheets 1a to 1d of this embodiment can be produced easily and are suitable for production in a larger scale and low cost, compared to the microlenses and the mirrors inclining by 45° that are produced by different processes directly on an interface BGA.

Figure 8:
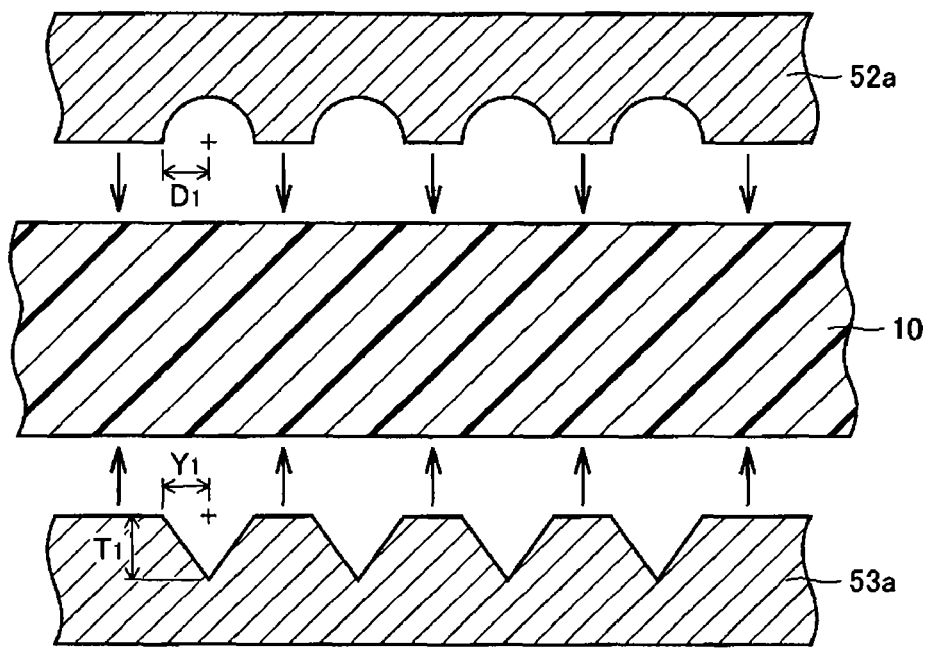
FIG. 8 is a schematic cross-sectional view illustrating a first step of a production process of a three-dimensional optical sheet according to an embodiment of the present invention.
Figure 9:
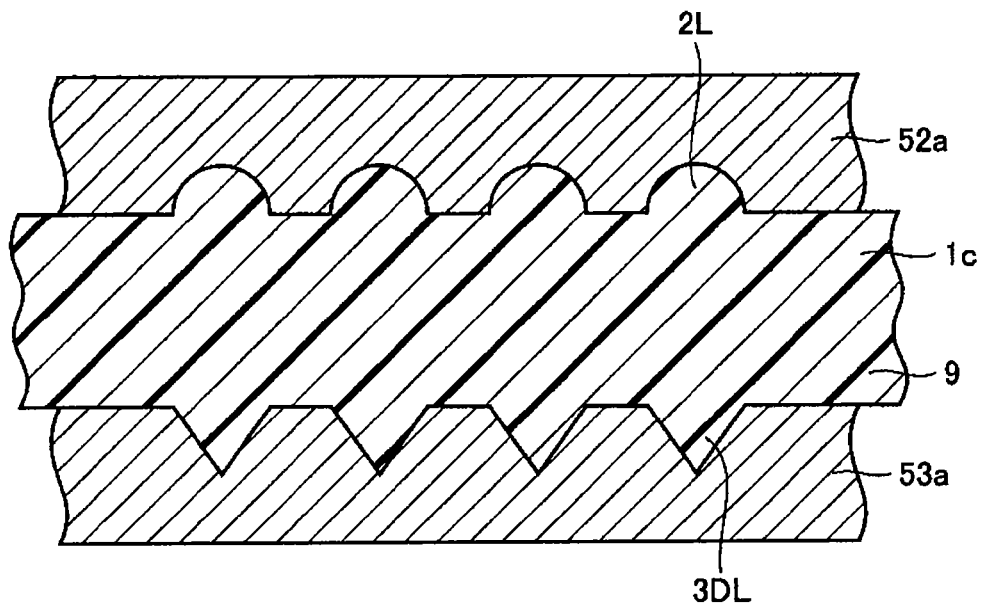
FIG. 9 is a schematic cross-sectional view illustrating a second step of the production process of the three-dimensional optical sheet according to the embodiment of the present invention.
Figure 10:
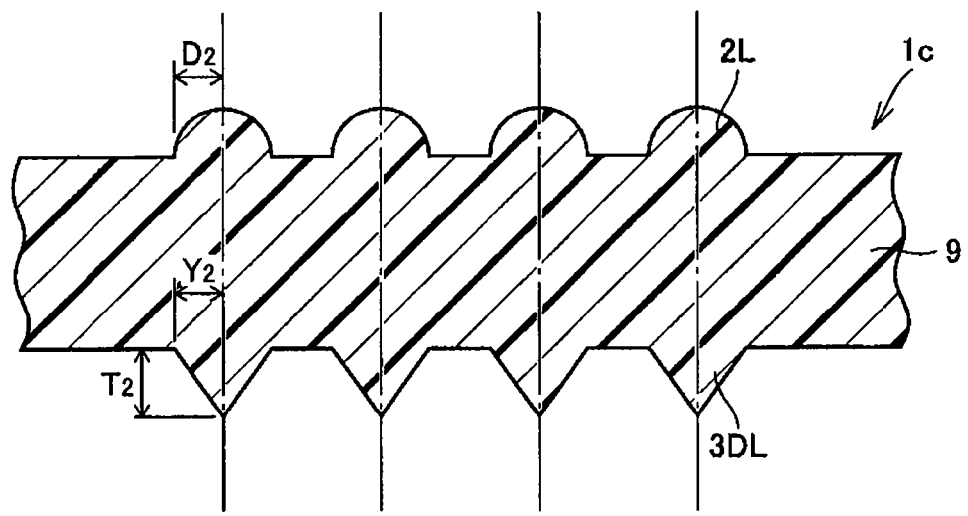
FIG. 10 is a schematic cross-sectional view illustrating a third step of the production process of the three-dimensional optical sheet according to the embodiment of the present invention.

FIGS. 8 to 10 are schematic cross-sectional views illustrating a process in the order of steps of producing a three-dimensional optical sheet according to an embodiment of the present invention. In reference to FIGS. 8 to 10, the three-dimensional optical sheet 1c (FIG. 5) is produced by a mold process using mold tools 52a and 53a. First, as shown in FIG. 8, a thin resin film 10 set between the mold tools 52a and 53a is heated. Subsequently, the heated thin resin film 10 is compressed between the mold tools 52a and 53a from the directions indicated by the arrows to be molded as shown in FIG. 9. After cooling, the mold tools are removed to give a three-dimensional optical sheet 1c such as that shown in FIG. 10.

The heating of the thin resin film 10 can be performed by a proper method, for example, a method in which the thin resin film 10 is disposed between the mold tools 52*a* and 53*a* and then is heated or a method in which only the thin resin film 10 is heated in advance without being in contact with the mold tools. The thin resin film 10 can be heated with a heater (not shown) disposed just below or inside the mold tools 52*a* and 53*a*.

The thin resin film 10 is preferably heated to a temperature not lower than the flow starting temperature of the resin. Press processing of the thin resin film 10 heated to a temperature not lower than the flow starting temperature allows readily forming of ultrafine shapes with high accuracy by a flow phenomenon of the resin, and also the cost can be reduced. Lenses each having a diameter of 5 μm or more can be readily formed by the production method of the present invention as long as the mold tool has sufficiently high precision. Similarly, it is easy to form D-shaped lenses each having a width of 5 μm or more.

The three-dimensional optical sheet of the present invention also can be produced by a nanoimprint method. In the nanoimprint method, a thin resin film set in a mold tool having surfaces provided with fine asperities of a nano level is heated to a glass transition temperature or higher, and then the mold tool is impressed on the thin resin film for a certain period of time. After the thin resin film is cooled to a temperature not higher than the glass transition temperature, the mold tool is removed from the thin resin film. Since the asperities on the surfaces of the mold tool are transferred to the thin resin film by nanoimprinting, three-dimensional fine shapes of a submicron order can be readily formed by a simple manufacturing process, and the accuracy of optical axes and the accuracy of positions of the convex lens sections and the reflecting sections are dramatically increased. In addition, the process of producing the convex lens sections and the reflecting sections achieves high reproducibility of the shapes and low cost and allows easy production on a large scale.

In order to increase the throughput of the process of producing the three-dimensional optical sheet, the thin resin film is preferably formed of a resin that melts in a relatively narrow temperature range and is rapidly hardened by cooling. Therefore, for example, polycarbonate, polyimide, polymethyl methacrylate, polyether sulfone, polysulfone, and polyetherimide are preferred. The thickness of the thin resin film is not particularly limited, but is preferably 20 μm or more and more preferably 100 μm or more.

The thin resin film is preferably set between mold tools by, first, fixing the thin resin film to one mold tool and then setting the other mold tool. By doing so, troubles such as uplift of the thin resin film on the mold tool and incorporation of air bubbles can be prevented, resulting in an increase in reproducibility of fine structures. Furthermore, uplift of the thin resin film and incorporation of air bubbles to the thin resin film can be prevented by conducting a series of steps of setting, heating, and compressing the thin resin film under a vacuum atmosphere.

The mold tool can be produced by a process including the steps of forming a resin mold by a lithography process, plating the resin mold with a layer composed of a metal material, and removing the resin mold. Since the mold tool produced by this process is a precise fine structure, the thin resin film can be molded so as to have fine shapes with high size accuracy, and the surface roughness (Ra) of the molded product can be suppressed to 10 μm or less. In addition, since the molding is performed using the mold tool, a molded product with high reproducibility can be integrally molded.

Figure 11:
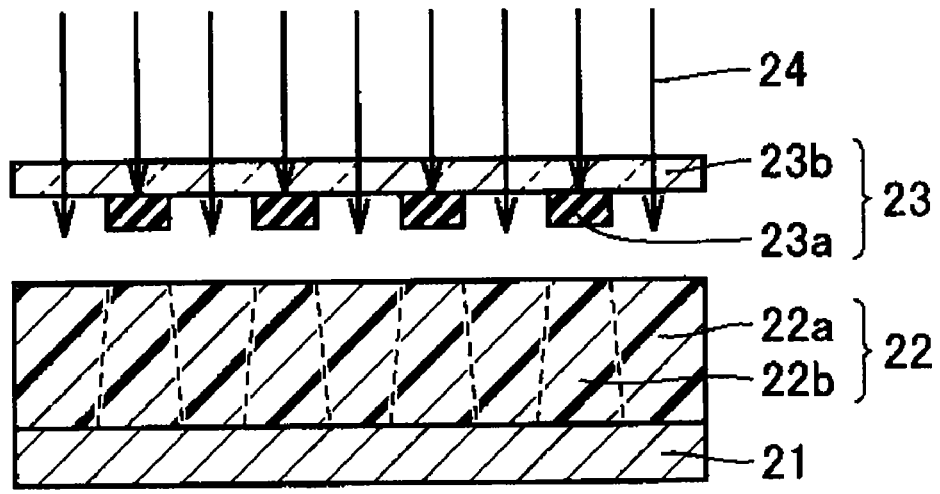
FIG. 11 is a schematic cross-sectional view illustrating a first step of a production process of a mold tool that is used for producing a three-dimensional optical sheet according to an embodiment of the present invention.
Figure 12:
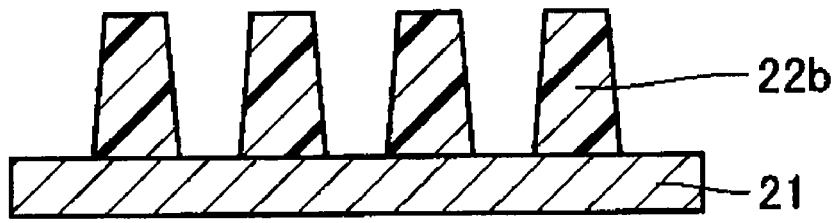
FIG. 12 is a schematic cross-sectional view illustrating a second step of the production process of the mold tool that is used for producing the three-dimensional optical sheet according to the embodiment of the present invention.

FIGS. 11 to 15 are schematic cross-sectional views illustrating a process in the order of steps of producing a mold tool that is used for producing a three-dimensional optical sheet according to an embodiment of the present invention. As shown in FIG. 11, first, a resist 22 is formed on a substrate 21. The substrate 21 is, for example, a metal substrate composed of copper, nickel, or stainless steel. Alternatively, a silicon substrate obtained by sputtering a metal material such as titanium or chromium can be used. The material of the resist 22 is, for example, a resin material of which main component is a polymethacrylic acid ester such as polymethyl methacrylate or a chemical amplification type resin material having sensitivity to X-ray or UV-ray. The thickness of the resist 22 can be properly determined according to the mold tool to be formed and can be, for example, several hundreds micrometers.

Subsequently, a mask 23 is arranged on the resist 22, and irradiation with, for example, X-ray 24 or UV-ray through the mask 23 is performed. When the mold tool is required to have a high aspect ratio, X-ray (wavelength: 0.4 nm), which has a wavelength shorter than that of UV-ray (wavelength: for example, 365 nm), is preferably used. In particular, a LIGA (Lithographie Galvanoformung Abformung) process using synchrotron-radiation-induced X-ray (hereinafter, referred to as "SR"), which is X-ray having high directivity, can perform deep lithography and is advantageous in that a large amount of fine structures having a height of several hundreds micrometers can be produced at high accuracy of a submicron order and a mold tool for a thin resin film having a large thickness can be provided. In this embodiment, a method using X-ray irradiation is exemplified.

The mask 23 is composed of an X-ray absorbing layer 23*a* formed according to the pattern of the mold tool and a translucent base material 23*b*. The material of the translucent base material 23*b* can be SiN, SiC, diamond, or titanium. The material of the X-ray absorbing layer 23*a* can be a heavy metal such as gold, tungsten, or tantalum or a compound thereof. When the resist 22 on the substrate 21 is a positive resist, exposure of X-ray 24 decomposes (cleavage of molecular chain) resist 22*a* portions of the resist 22, but resist 22*b* portions are not exposed due to the X-ray absorbing layer 23*a*. Therefore, only the portions decomposed with the X-ray 24 are removed by development to give a resist mold composed of the resist 22*b* such as that shown in FIG. 12.

Figure 13:
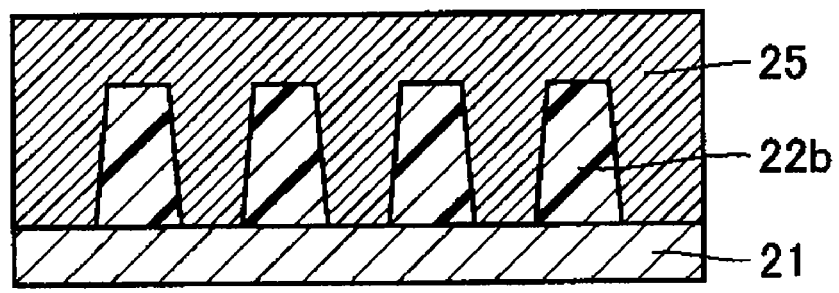
FIG. 13 is a schematic cross-sectional view illustrating a third step of the production process of the mold tool that is used for producing the three-dimensional optical sheet according to the embodiment of the present invention.

Subsequently, as shown in FIG. 13, a metal material layer 25 is deposited on the resin mold by plating. The metal material layer 25 can be formed by electrocasting (electrolytic plating) or electroless plating. The electrocasting is a process of forming a metal material layer on an electrically conductive substrate using a metal ion solution. The metal material layer 25 can be deposited on a resin mold by electrocasting using the electrically conductive substrate as a feed section. On the other hand, in the electroless plating, a reducing agent such as sodium hypophosphite is added to a metal ion solution of, for example, nickel, and the metal ion solution is heated to 90 to 100° C. to form a metal material layer 25 on a resin mold, without feeding a current. The plating efficiency can be increased by applying a catalyst such as Pd to the surface of the resin mold in advance.

Figure 14:
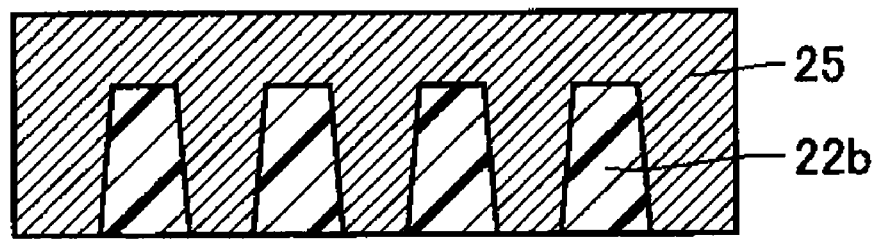
FIG. 14 is a schematic cross-sectional view illustrating a fourth step of the production process of the mold tool that is used for producing the three-dimensional optical sheet according to the embodiment of the present invention.

A pedestal of the mold tool can be formed by plating beyond the height of the resin mold. Examples of the metal material include nickel, copper, iron, rhodium, and alloys thereof. From the viewpoint of increasing abrasion resistance of the mold tool, nickel and nickel alloys such as nickel manganese alloy are preferred. After the plating, as shown in FIG. 14, the substrate 21 is removed by wet etching using an acid or an alkali or a machining process. Then, the resist 22*b* is removed by wet etching or plasma ashing to give a mold tool such as that shown in FIG. 15.

Next, a first modification of the process (FIGS. 11 to 15) of producing a mold tool will be described. FIGS. 16 to 21 are schematic cross-sectional views illustrating a process in the order of steps of producing a mold tool that is used for producing a three-dimensional optical sheet in a first modification according to an embodiment of the present invention.

Figure 15:
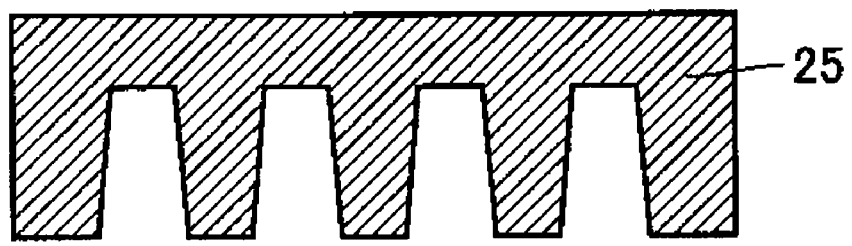
FIG. 15 is a schematic cross-sectional view illustrating a fifth step of the production process of the mold tool that is used for producing the three-dimensional optical sheet according to the embodiment of the present invention.
Figure 16:
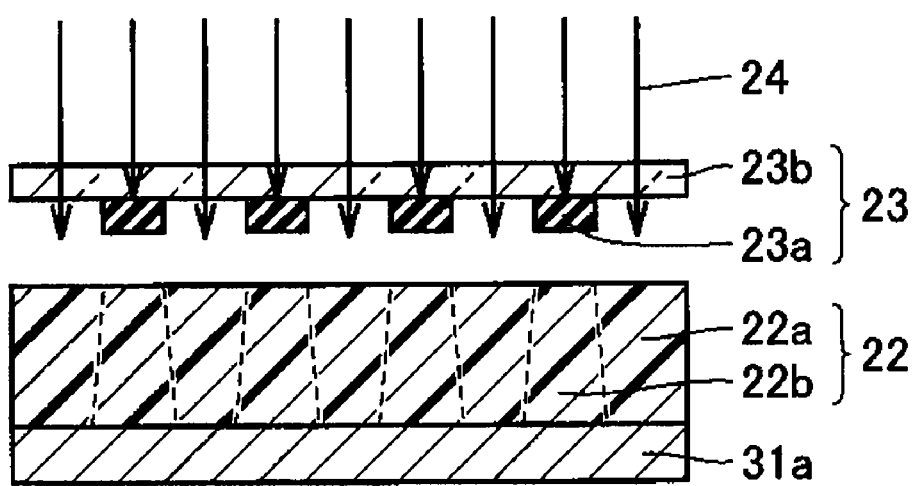
FIG. 16 is a schematic cross-sectional view illustrating a first step of a production process of a mold tool that is used for producing a three-dimensional optical sheet in a first modification according to an embodiment of the present invention.
Figure 17:
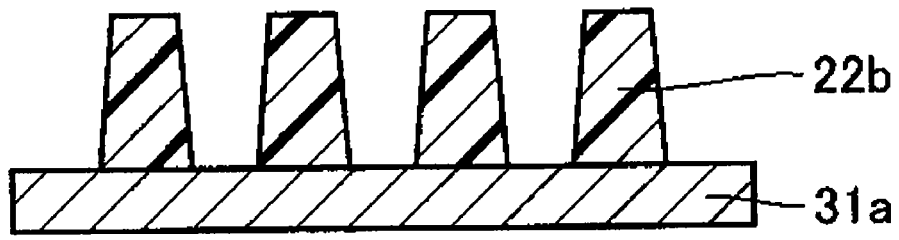
FIG. 17 is a schematic cross-sectional view illustrating a second step of the production process of the mold tool that is used for producing the three-dimensional optical sheet in the first modification according to the embodiment of the present invention.

In the production process shown in FIGS. 11 to 15, the mold tool is produced by removing the electrically conductive substrate 21 (FIG. 14), but, in this modification, the mold tool can be produced without removing the substrate. First, as shown in FIG. 16, a resist 22 is formed on a substrate 31*a*. Subsequently, a mask 23 is arranged on a resist 22, followed by lithography as in above. After exposure, resist 22*a* portions are removed by development to give a resin mold composed of resist 22*b* such as that shown in FIG. 17.

Figure 18:
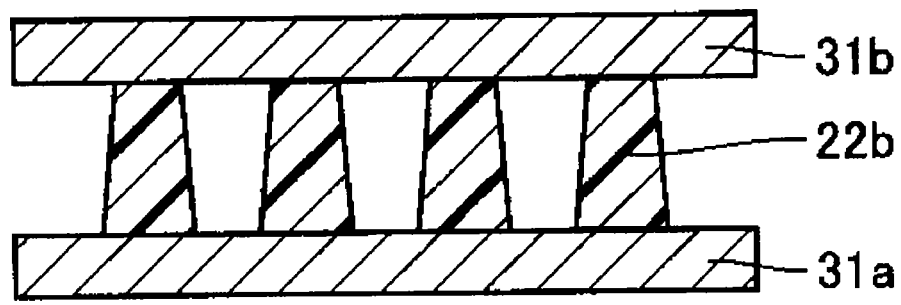
FIG. 18 is a schematic cross-sectional view illustrating a third step of the production process of the mold tool that is used for producing the three-dimensional optical sheet in the first modification according to the embodiment of the present invention.
Figure 19:
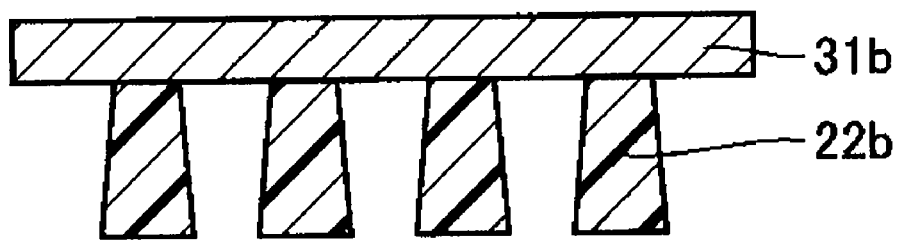
FIG. 19 is a schematic cross-sectional view illustrating a fourth step of the production process of the mold tool that is used for producing the three-dimensional optical sheet in the first modification according to the embodiment of the present invention.
Figure 20:
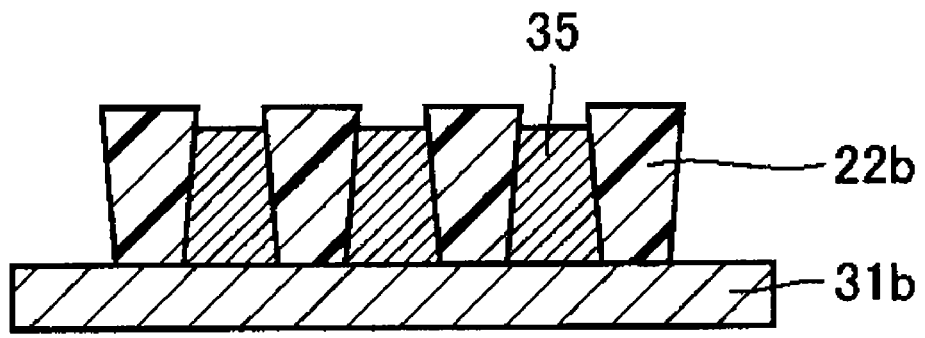
FIG. 20 is a schematic cross-sectional view illustrating a fifth step of the production process of the mold tool that is used for producing the three-dimensional optical sheet in the first modification according to the embodiment of the present invention.
Figure 21:
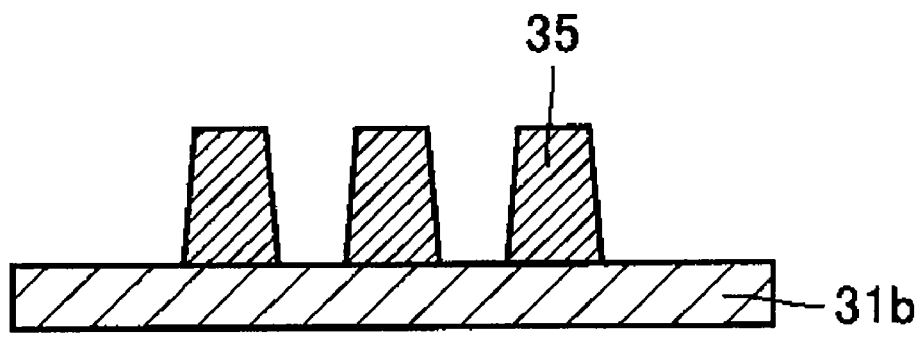
FIG. 21 is a schematic cross-sectional view illustrating a sixth step of the production process of the mold tool that is used for producing the three-dimensional optical sheet in the first modification according to the embodiment of the present invention.

Subsequently, as shown in FIG. 18, an electrically conductive substrate 31*b* is formed atop the resist 22*b*, followed by removal of the substrate 31*a* as shown in FIG. 19. Then, as shown in FIG. 20, electrocasting is performed using the electrically conductive substrate 31*b* as a plated electrode to deposit a metal material layer 35 in the resin mold. The resin mold is polished or ground to a predetermined uniform thickness if necessary, and then the resin mold is removed by wet etching or plasma aching. By doing so, a mold tool such as that shown in FIG. 21 can be prepared. In this mold tool, since the electrically conductive substrate 31*b* is used as the pedestal of the mold tool, electrocasting time necessary for forming a pedestal can be omitted. In addition, since the pedestal is not formed by electrocasting, warpage of the mold tool due to internal stress is small.

Next, a second modification of the above-described process of producing a mold tool will be described.

The mold tool can be produced by a process including the steps of forming a resin mold by a mold process, forming a layer composed of a metal material in the resin mold on a substrate by plating, and removing the resin mold. The master mold used in the step of forming the resin mold by the mold process can be produced by the above-described lithography process. Therefore, the master mold is a precise fine structure, and a daughter mold produced from the master mold also can be a precise fine structure. Accordingly, fine shapes can be applied to a thin resin film with high size accuracy, and the surface roughness (Ra) of the molded product can be suppressed to 10 nm or less. In addition, since the mold process using the mold tool is employed, a molded product with high reproducibility can be integrally molded.

Figure 22:
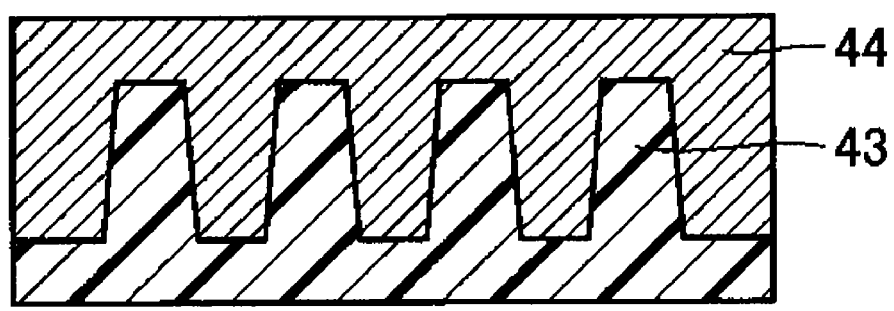
FIG. 22 is a schematic cross-sectional view illustrating a first step of a production process of a mold tool that is used for producing a three-dimensional optical sheet in a second modification according to an embodiment of the present invention.
Figure 23:
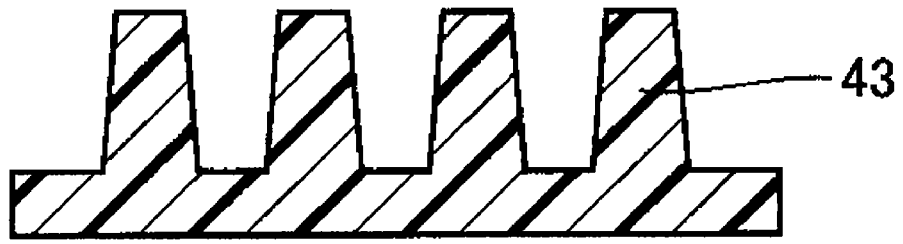
FIG. 23 is a schematic cross-sectional view illustrating a second step of the production process of the mold tool that is used for producing the three-dimensional optical sheet in the second modification according to the embodiment of the present invention.
Figure 24:
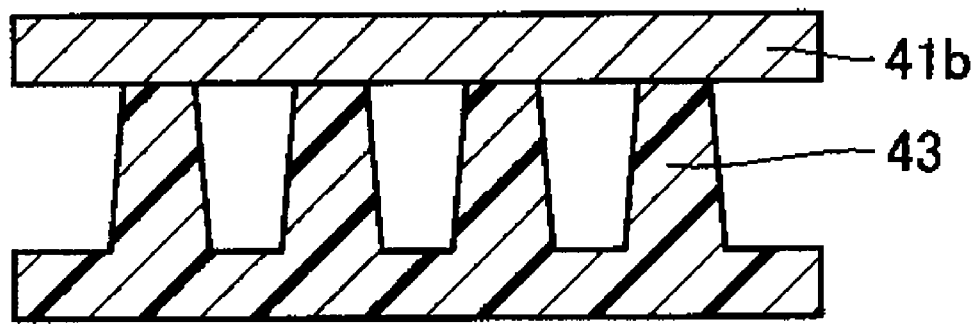
FIG. 24 is a schematic cross-sectional view illustrating a third step of the production process of the mold tool that is used for producing the three-dimensional optical sheet in the second modification according to the embodiment of the present invention.
Figure 25:
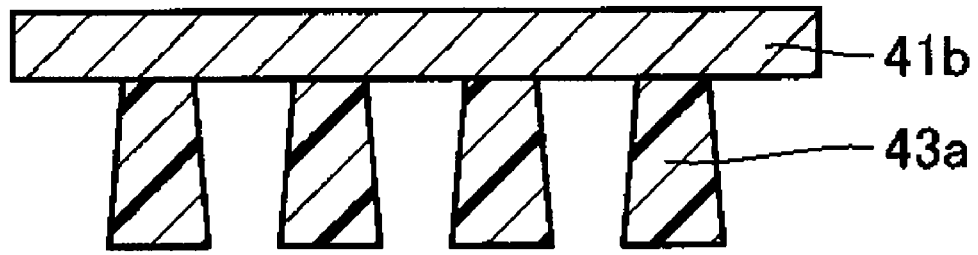
FIG. 25 is a schematic cross-sectional view illustrating a fourth step of the production process of the mold tool that is used for producing the three-dimensional optical sheet in the second modification according to the embodiment of the present invention.

FIGS. 22 to 27 are schematic cross-sectional views illustrating a process in the order of steps of producing a mold tool that is used for producing a three-dimensional optical sheet in a second modification according to an embodiment of the present invention. First, as shown in FIG. 22, a mold process such as injection molding is performed using a mold tool 44 having convex portions to produce a resin mold 43 such as that shown in FIG. 23. Examples of the material of the resin mold include polymethyl methacrylate, polypropylene, and polycarbonate. Subsequently, as shown in FIG. 24, an electrically conductive substrate 41*b* is formed atop the resin mold 43, and then, as shown in FIG. 25, the resin mold 43 is partially polished or ground.

Figure 26:
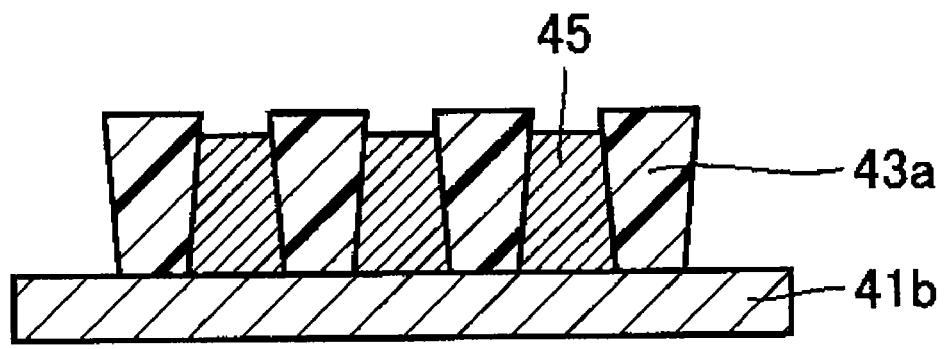
FIG. 26 is a schematic cross-sectional view illustrating a fifth step of the production process of the mold tool that is used for producing the three-dimensional optical sheet in the second modification according to the embodiment of the present invention.
Figure 27:
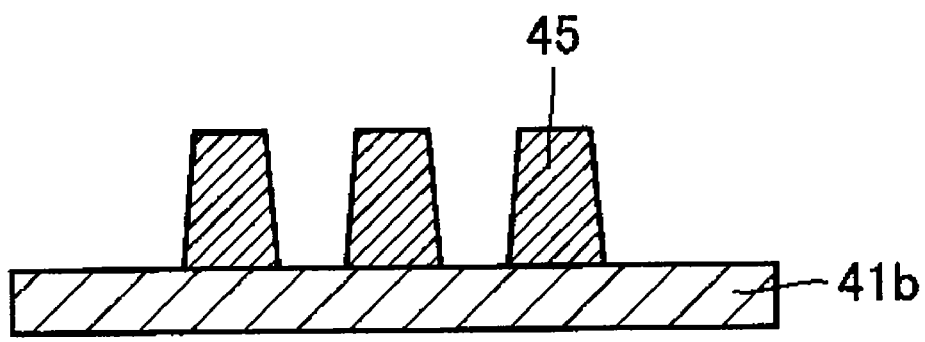
FIG. 27 is a schematic cross-sectional view illustrating a sixth step of the production process of the mold tool that is used for producing the three-dimensional optical sheet in the second modification according to the embodiment of the present invention.

Then, as shown in FIG. 26, electrocasting is performed using the electrically conductive substrate 41*b* as a plated electrode to deposit a metal material layer 45 in the resin mold 43*a*. The resin mold 43*a* is polished or ground to a predetermined uniform thickness if necessary, and then the resin mold 43*a* is removed by wet etching or plasma ashing. By doing so, a mold tool such as that shown in FIG. 27 is obtained. In this mold tool, since the electrically conductive substrate 41*b* is used as a pedestal of the mold tool, electrocasting time necessary for forming a pedestal can be omitted. In addition, since the pedestal is not formed by electrocasting, warpage of the mold tool due to internal stress is small.

Figure 28:
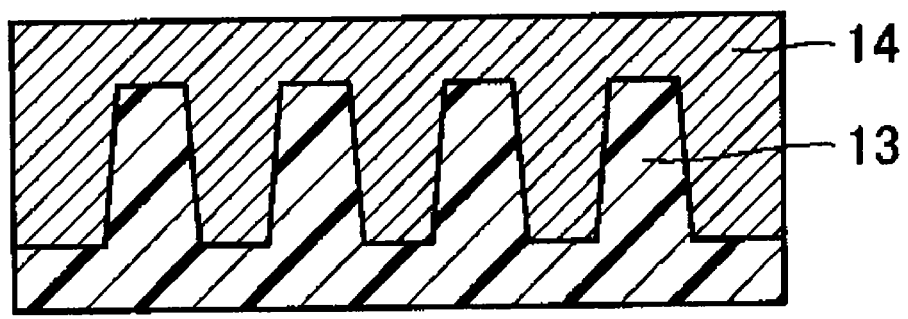
FIG. 28 is a schematic cross-sectional view illustrating a first step of a production process of a mold tool that is used for producing a three-dimensional optical sheet in a third modification according to an embodiment of the present invention.
Figure 29:
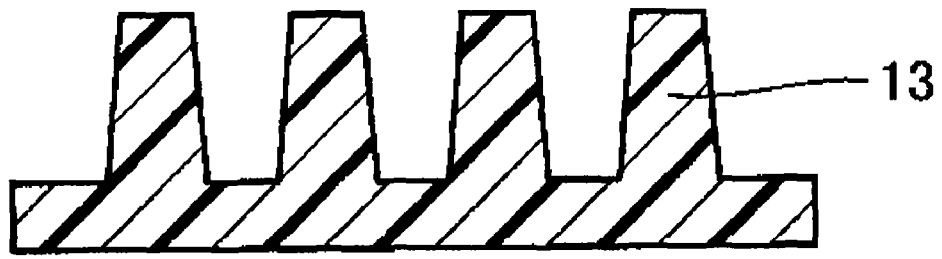
FIG. 29 is a schematic cross-sectional view illustrating a second step of the production process of the mold tool that is used for producing the three-dimensional optical sheet in the third modification according to the embodiment of the present invention.
Figure 30:
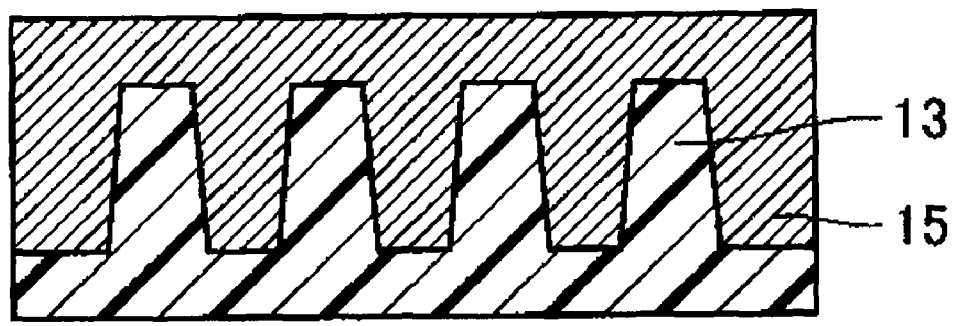
FIG. 30 is a schematic cross-sectional view illustrating a third step of the production process of the mold tool that is used for producing the three-dimensional optical sheet in the third modification according to the embodiment of the present invention.
Figure 31:
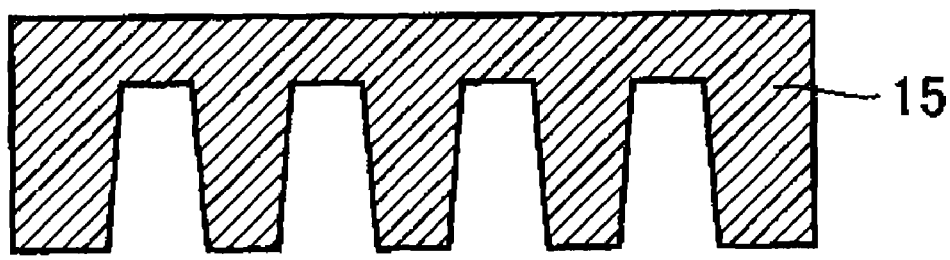
FIG. 31 is a schematic cross-sectional view illustrating a fourth step of the production process of the mold tool that is used for producing the three-dimensional optical sheet in the third modification according to the embodiment of the present invention.
Figure 32:
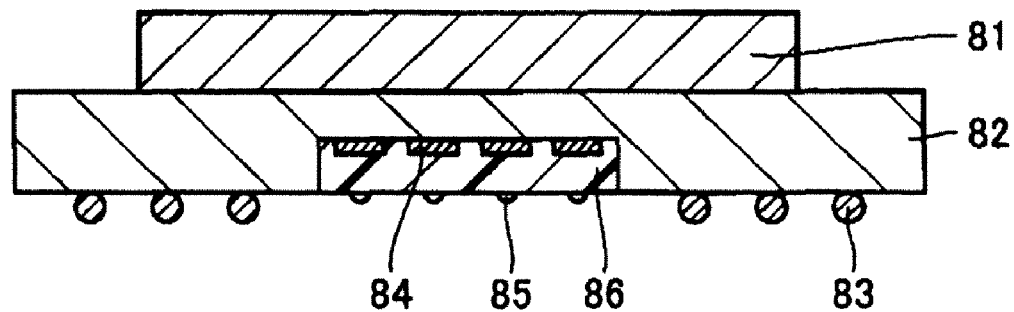
FIG. 32 is a cross-sectional view illustrating a fundamental structure of a known interface BGA.
Figure 33:
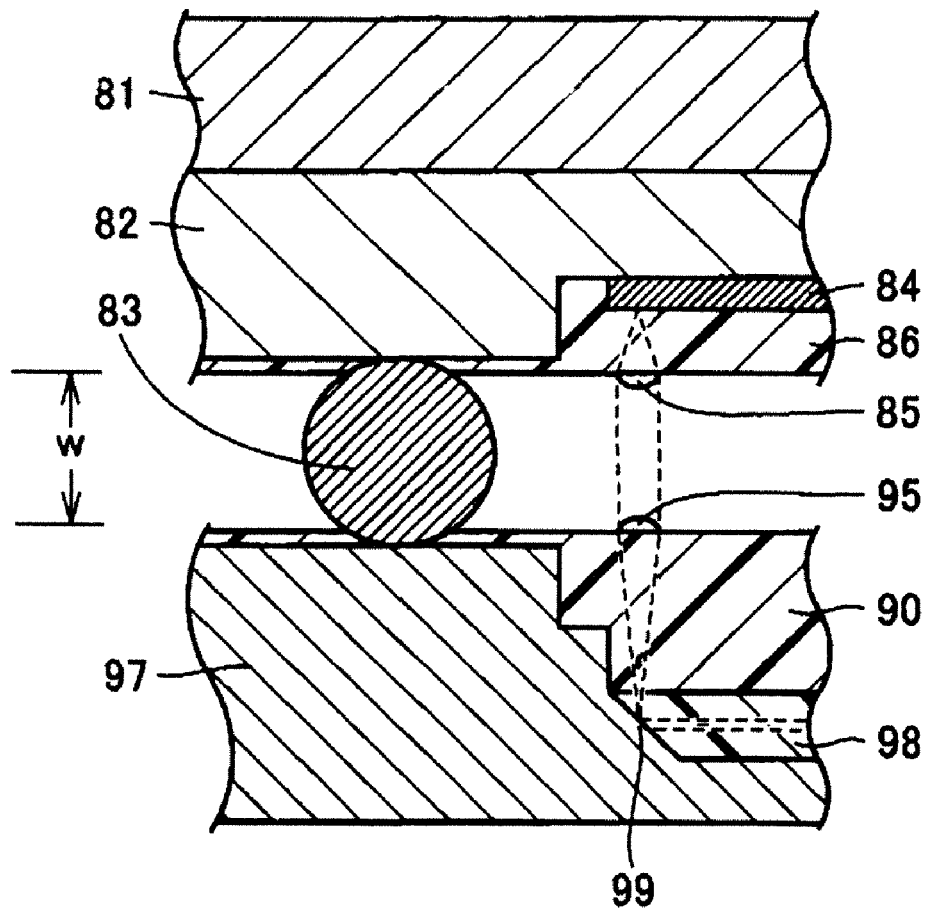
FIG. 33 is a cross-sectional view illustrating a state that the known interface BGA is mounted on a substrate.

Next, a third modification of the above-described process of producing a mold tool will be described. FIGS. 28 to 31 are schematic cross-sectional views illustrating a process in the order of steps of producing a mold tool that is used for producing a three-dimensional optical sheet in a third modification according to an embodiment of the present invention. First, as shown in FIG. 28, a mold process is performed using a mold tool 14 having convex portions to give a resin mold 13 such as that shown in FIG. 29. Subsequently, as shown in FIG. 30, a metal material layer 15 is formed on the resin mold 13 by electroless plating. Then, the resin mold 13 is removed by wet etching or plasma ashing to give a mold tool such as that shown in FIG. 31.

Example 1

In this Example, a mold tool was produced by the process shown in FIGS. 11 to 15. First, a substrate 21 was prepared by forming a Ti film by a sputtering method on a surface of a Si substrate having a thickness of 5 mm and a diameter of 3 inches. A resist 22 composed of an acrylic resin and having a thickness of 100 μm was formed on the substrate 21. Subsequently, a mask 23 was arranged on the resist 22, and irradiation with X-ray 24 through the mask 23 was performed (FIG. 11). The mask 23 was composed of a translucent base material 23*b* of silicon nitride having a thickness of 2 μm and an X-ray absorbing layer 23*a* of tungsten nitride having a thickness of 3 μm. The X-ray 24 used was SR, and lithography was conducted in an area of 50 mm×50 mm.

Subsequently, development with methyl isobutyl ketone, rinse with isopropanol, and washing with pure water were performed. As a result, a resin mold having a resist 22*b* such as that shown in FIG. 12 was given. Then, as shown in FIG. 13, a metal material layer 25 composed of Ni was deposited in the resin mold by electrocasting. The electrocasting was conducted in the state that the resin mold was immersed in a nickel sulfamate bath such that the metal material layer 25 was deposited beyond the top of the resin mold.

After the electrocasting, as shown in FIG. 14, the substrate 21 (FIG. 13) was removed by polishing to give a flat structure having a thickness of 500 μm. Subsequently, the resist 22*b* was removed by ashing with oxygen plasma. This gave a mold tool having a metal material layer 25 (FIG. 15). This mold tool was one for forming convex lens sections 2A (FIG. 7). The concrete cross-sectional shape thereof was the same as that of the mold tool 52*a* (mold tool for convex lens sections 2L) shown in FIG. 8 and had hemispherical holes with a radius $D_1$ of 50 μm. Then, a mold tool for forming reflecting sections 3DL (FIG. 5) was produced by the same manner. The concrete cross-sectional shape of this mold tool was the same as that of the mold tool 53*a* shown in FIG. 8 and had rectangular cylindrical holes with a $T_1$ of 80 μm and a $Y_1$ of 50 μm.

Then, a thin resin film 10 composed of a polycarbonate film was arranged on the mold tool for the reflecting sections 3DL (as in FIG. 8), and then the mold tool for the convex lens sections 2A was set on the thin resin film 10. The thin resin film 10 was heated to 160° C., which was higher than the glass transition temperature (about 145° C.) of the polycarbonate. The heating of the thin resin film 10 was conducted with a heater disposed just below the mold tool. Subsequently, the thin resin film 10 was compressed between the mold tools at a pressure of 10 MPa (as in FIG. 9) and then cooled, and then the mold tools 52a and 53a were removed. As a result, a three-dimensional optical sheet having the convex lens sections 2A and the reflecting sections 3DL was given (as in FIG. 10).

In the resulting three-dimensional optical sheet, the optical axes of the convex lens sections 2A coincided with the optical axes of the reflecting sections 3DL. The convex lens sections 2A had a hemispherical shape having a radius $D_2$ of 50 µm, and the reflecting sections 3DL had a rectangular cylindrical shape having a $T_2$ of 80 µm and a $Y_2$ of 50 µm. The machining accuracy was ±1 µm, which proves that machining at significantly high accuracy can be achieved. The three-dimensional optical sheet after the molding was arranged between an optical element 4 and a substrate 5, as in the three-dimensional optical sheet 1a shown in FIG. 1. The direction of optical signals transmitted from the substrate 5 along a plane direction of the sheet section 9 was changed by the reflecting section 3DL, and the optical signals 6 were collected in the optical element 4 by the convex lens section 2A. That is, the optical element 4 and the substrate 5 were optically connected.

Example 2

In this embodiment, a mold tool was produced by the process shown in FIGS. 22 to 27. First, as shown in FIG. 22, injection molding of polymethyl methacrylate was performed using a mold tool 44 composed of Ni having convex portions to produce a resin mold 43 such as that shown in FIG. 23. Subsequently, as shown in FIG. 24, an electrically conductive substrate 41b was formed atop the resin mold 43, and then, as shown in FIG. 25, the resin mold 43 (FIG. 24) was partially polished. Then, as shown in FIG. 26, electrocasting was performed using the electrically conductive substrate 41b as a plated electrode to deposit a metal material layer 45 composed of Ni in the resin mold 43a. Then, the resin mold 43a was removed by wet etching to give a mold tool such as that shown in FIG. 27.

This mold tool was one for forming convex lens sections 2L (FIG. 5), and, as shown in FIG. 8, the mold too 52a had D-shaped holes with a radius $D_1$ of 50 µm. Subsequently, a mold tool 53a for forming reflecting sections 3DL (FIG. 5) was produced by the same manner. FIG. 8 shows the concrete shape of the resulting mold tools. The mold tool 53a for forming reflecting sections 3DL had rectangular cylindrical holes with a $T_1$ of 80 µm and a $Y_1$ of 50 µm.

Then, as shown in FIG. 8, a polycarbonate film (FS-1650 manufactured by SUMITOMO BAKELITE CO., LTD.) having a thickness of 200 µm as the thin resin film 10 was set on the mold tool 53a. Then, the mold tool 52a was set on the thin resin film 10, and the thin resin film 10 was heated to 160° C., which was higher than the glass transition temperature (about 145° C.) of the polycarbonate. The heating of the thin resin film 10 was conducted with a heater (not shown) disposed just below the mold tool 53a. Subsequently, the thin resin film 10 was molded by compress between the mold tools 52a and 53a at a pressure of 10 MPa (FIG. 9). After cooling, the mold tools 52a and 53a were removed to give a three-dimensional optical sheet 1c (FIG. 10).

In the resulting three-dimensional optical sheet 1c, the optical axes of the convex lens sections 2L coincided with the optical axes of the reflecting sections 3DL. The convex lens sections 2L had a D-shape having a radius $D_2$ of 50 µm, and the reflecting sections 3DL had a rectangular cylindrical shape having a $T_2$ of 80 µm and a $Y_2$ of 50 µm. The machining accuracy was ±2 µm, which proves that machining at significantly high accuracy can be achieved. The three-dimensional optical sheet 1c after the molding was arranged between an optical element 4 and a substrate 5, as in the three-dimensional optical sheet 1a shown in FIG. 1. The direction of optical signals transmitted from the substrate 5 along a plane direction of the sheet section 9 (FIG. 5) was changed by the reflecting section 3DL, and the optical signals 6 were collected in the optical element 4 by the convex lens section 2L. That is, the optical element 4 and the substrate 5 were optically connected.

Example 3

In this embodiment, a mold tool was produced by the process shown in FIGS. 28 to 31. First, as shown in FIG. 28, imprinting of polymethyl methacrylate was performed using a mold tool 14 composed of Ni having convex portions to produce a resin mold 13 such as that shown in FIG. 29. Subsequently, the surface of the resin mold 13 was catalyzed with Pd, and then, as shown in FIG. 30, a metal material layer 15 composed of Ni was deposited on the resin mold 13 by electroless plating. Then, the resin mold 13 was removed by wet etching to give a mold tool such as that shown in FIG. 31.

This mold tool was one for forming convex lens sections 2A (FIG. 7). The concrete cross-sectional shape thereof was the same as that of the mold tool 52a (mold tool for convex lens sections 2L) shown in FIG. 8 and had hemispherical holes with a radius $D_1$ of 45 µm. Then, a mold tool for forming reflecting sections 3DL (FIG. 5) was produced by the same manner. The concrete cross-sectional shape of this mold tool was the same as that of the mold tool 53a shown in FIG. 8 and had rectangular cylindrical holes with a $T_1$ of 70 µm and a $Y_1$ of 45 µm.

Then, a thin resin film 10 composed of a polycarbonate film was arranged on the mold tool for the reflecting sections 3DL (as in FIG. 8), and then the mold tool for the convex lens sections 2A was set on the thin resin film 10. The thin resin film 10 was heated to 160° C., which was higher than the glass transition temperature (about 145° C.) of the polycarbonate. Subsequently, the thin resin film 10 was molded by compress between the mold tools at a pressure of 10 MPa (as in FIG. 9). After cooling, the mold tools were removed to give a three-dimensional optical sheet (FIG. 10).

In the resulting three-dimensional optical sheet, the optical axes of the convex lens sections 2A coincided with the optical axes of the reflecting sections 3DL. The convex lens sections 2A had a hemispherical shape having a radius $D_2$ of 45 µm, and the reflecting sections 3DL had a rectangular cylindrical shape having a $T_2$ of 70 µm and a $Y_2$ of 45 µm. The machining accuracy was ±1 µm, which proves that machining at significantly high accuracy could be achieved. The three-dimensional optical sheet after the molding was arranged between an optical element 4 and a substrate 5, as in the three-dimensional optical sheet 1a shown in FIG. 1. The direction of optical signals transmitted from the substrate 5 along a plane direction of the sheet section 9 was changed by the reflecting section 3DL, and the optical signals 6 were collected in the optical element 4 by the convex lens section 2A. That is, the optical element 4 and the substrate 5 were optically connected.

It should be understood that Embodiments and Examples described herein are merely exemplary in every aspect and are not intended to limit the invention. It is intended that the scope of the present invention is defined by claims, not by the description above, and includes all modifications within the meaning and range equivalent to the claims.

INDUSTRIAL APPLICABILITY

A mounting method for easy alignment can be provided. Furthermore, an optical module with high accuracy and low cost can be provided.

The invention claimed is:

1. An optical sheet being disposed between optical elements and a substrate for optically connecting the optical elements and the substrate, the optical sheet comprising:
   a sheet section including first and second main surfaces;
   convex lens sections being provided on the first main surface and collecting light; and
   reflecting sections being provided on the second main surface and changing the direction of light traveling along the second main surface such that the light enters the convex lens sections,
   wherein the reflecting sections each have a reflecting surface for reflecting the light to change direction of the light, and
   each reflecting surface is provided such that an optical axis of each reflecting section coincides with an optical axis of the convex lens sections.

2. The optical sheet according to claim 1, wherein the reflecting sections are configured so as to change the direction of light traveling along the second main surface by 90°.

3. The optical sheet according to claim 1, wherein the convex lens sections are either hemispherical or D-shaped.

4. The optical sheet according to claim 1, wherein the convex lens sections are arrayed either in an area array or in a linear array.

5. The optical sheet according to claim 1, wherein the reflecting sections each include a portion covered with at least one material selected from the group consisting of gold, silver, and aluminum.

6. The optical sheet according to claim 1 further comprising a portion formed of a material that is irradiated with an electron beam.

7. The optical sheet according to claim 1, wherein the convex lens sections and the reflecting sections are formed by a mold process using mold tools.

8. The optical sheet according to claim 7, wherein the mold tools are each produced by a process comprising the steps of:
   forming a resin mold by a lithography process;
   forming a layer composed of a metal material on the resin mold by plating; and
   removing the resin mold.

9. The optical sheet according to claim 7, wherein the mold tools are each produced by a process comprising the steps of:
   forming a resin mold by a mold process;
   forming a layer composed of a metal material on the resin mold by plating; and
   removing the resin mold.

10. A mounting method comprising the steps of:
    preparing an optical sheet according to claim 1; and
    mounting optical elements on a substrate such that the optical elements and the substrate are optically connected via the optical sheet.

11. An optical module comprising:
    an optical sheet according to claim 1;
    a substrate supporting the optical sheet; and
    optical elements being optically connected to the substrate via the optical sheet.

* * * * *